April 16, 1963 R. H. NELSON 3,085,316

METHOD OF MAKING A RESISTOR

Filed March 26, 1959

*INVENTOR.*
ROBERT H. NELSON

*BY* [signature]
Attorney

United States Patent Office 3,085,316

Patented Apr. 16, 1963

3,085,316

METHOD OF MAKING A RESISTOR

Robert H. Nelson, Webster, N.Y., assignor to Sage Electronics Corporation, Rochester, N.Y., a corporation of New York Filed Mar. 26, 1959, Ser. No. 802,154

2 Claims. (Cl. 29—155.63)

The present invention relates to a process for manufacturing insulated electrical or electronic components, such as resistors, and more particularly wire-wound resistors.

It is well known that electrical components, such as resistors, give off a substantial amount of heat during use, and it is necessary that this heat be properly and effectively dissipated to prevent the component from overheating and destorying itself. Electrical insulating mediums are relatively poor heat conductors, and metal jacketing of electrical or electronic components is frequently done for the purpose of conducting the heat they generate to and through a metal chassis on which electrical or electronic equipment is built. It is generally accepted that to obtain the optimum in heat dissipation a resistor should have a uniform electrical insulating coating of a thickness no greater than is necessary to provide the required dielectric strength, and be mounted in an encircling metallic housing.

Heretofore, in the manufacture of such resistors an insulating coating of silicone or other suitable plastic, brought to the proper viscosity by the addition of a solvent, has been used, and has been applied, by the multi-dip or spray process with intermediate polymerizing bakes. The resistor coated in this way was finally "potted" into the metallic housing by "injection molding" techniques in which the centering of the unit is, however, difficult and which involve the addition of a solventless insulating vehicle in its liquid or plastic state to fill the space between the coated unit and the metallic housing. This additional layer of insulation between the coated wire-wound core and the metallic housing has prevented the maximum dissipation of heat. Furthermore, because such a coated wire-wound core is difficult to center in its metallic housing with injection-molding techniques, the insulation layers are necessarily unevenly distributed, and this uneven distribution creates "hot-spots" in the resistor.

Another method of manufacture, which has been commonly employed heretofore, involves the use of an insulating sleeve, such as woven fiberglass, which is pulled snugly over the coated or uncoated wire-wound core. This woven sleeve is used to pull the unit into a metallic housing; and the insulating medium is "potted" into the housing to fill the space between the sleeve and the resistor, and also the spaces in the woven glass fibers. Although this method of manufacture solves the centering problem somewhat, and the solid sleeving adds considerably to the dielectric strength of the unit, the sleeve tends to buckle and form voids in its contact both with the insulated wire-wound unit and with the housing, thus interfering with uniform dissipation of heat. Furthermore, it is extremely difficult to uniformly fill woven sleeving, such as fiberglass, with an insulating medium. Voids in the insulating fill, however, are extremely hazardous to the dielectric strength of the unit, and to heat transfer. Moreover, the use of any sleeving always projects the possibility or even probability of non-adhesive layers of insulation; and these represent further obstacles to efficient heat flow.

One of the objects of the present invention is to provide a method for making an insulated electrical component which will withstand large electrical loads and high temperatures without danger of damage or excessive heating.

Another object of this invention is to provide a method for manufacturing an electrical or electronic component which will permit the dissipation of heat uniformly and efficiently.

Another object of this invention is to provide an improved method for making an electrical or electronic component which will insure that the metallic housing is in direct physical contact with the entire irregular surface of the insulating coating of the component.

A further object of this invention is to provide an improved method for making an electronic or electrical component which permits the insulating covering to be of minimum thickness.

A further object of this invention is to provide an improved method of manufacturing an electrical or electronic component which enables the component to be smaller in size than conventional components of the same capacity.

A still further object of this invention is to provide an improved method for densifying a metallic shell of an electronic component of the character described while causing it to physically contact all the surface irregularities of the insulation coating.

Other objects of this invention will be apparent hereinafter from the specification, the drawings, and the recital of the appended claims.

Figure 1:
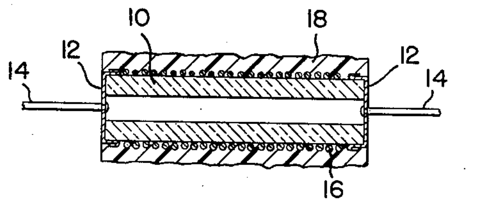
FIG. 1 is a sectional view to illustrate the structure of a resistor made according to one embodiment of this invention, the wire-wound core and insulating covering only of the resistor being shown.
Figure 2:
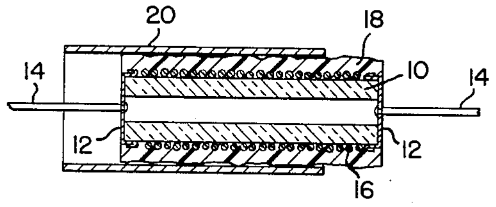
FIG. 2 is a sectional view showing the assembling of the coated wire-wound core in a metallic housing constructed according to this invention.

In the drawing the invention has been shown as applied to the manufacture of an electrical or electronic component, such as a resistor, having a cylindrical core 10, which is made of ceramic material. The invention may be used, however, in the manufacture of various forms of resistors and other electrical components, where dissipation of heat is desirable.

The ends of the core 10 are closed by metal conducting caps 12, each of which has a conducting wire 14 soldered or otherwise secured centrally therein to project outwardly from its adjacent end of the resistor. Wound by a conventional winding machine around the ceramic body or core 10 is a resistor wire 16, opposite ends of which are secured to the caps 12. The wire-wound core is then covered with an insulative covering 18 having a thickness no greater than is required to provide the proper dielectric strength to the unit. This covering may be a silicone varnish or other plastic to which a solvent has been added to obtain the desired consistency or viscosity. This liquid or plastic insulation is uniformly applied to the wire-wound core by a multi-dip or spray process with intermediate polymerizing bakes. This coating 18 is completely cured prior to the next step in the manufacture of this embodiment of the invention.

The coated assembly as shown in FIG. 1 is now slipped into a thin, flexible metallic shell or sleeve 20, made, for instance, of aluminum. This metallic shell 20 is of such a diameter so as to slidably fit over the coating 18 with minimum clearance therebetween. It will be noted that in the embodiment of the invention illustrated, the thin insulating covering 18 is replete with surface irregularities on its periphery, resulting in a number of voids between the inner wall of the shell 20 and the surface of the coating 18 when the shell 20 fits over the coated wire-wound core. As previously pointed out, a resistor having such voids between the metallic housing and the insulating coating does not properly dissipate the generated heat, and "hot-spots" are formed on the surface of the shell.

Figure 3:
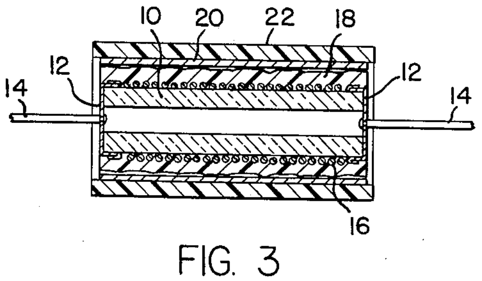
FIG. 3 is a sectional view showing the resistor assembled in the housing and in the removable nylon shell which is used in a further step in the manufacture of the resistor.

The next step, as shown in FIG. 3, is to place the resistor and its metallic shell into a sleeve 22 which is constructed of an elastic deformable plastic material, such as nylon. The inside diameter of this sleeve is such that the metallic shell slidably fits therein. The resistor, assembled in its nylon sleeve, is then placed in, for instance, a squeezing apparatus denoted generally at 30, in order to bring the metallic shell 20 into intimate contact with the peripheral surface of the insulating coating 18. The squeezing apparatus shown here comprises a collet 32, split as denoted at 38, to form a plurality of jaws 40 that have tapered outside surfaces 34. The collet 32 is slidably mounted in a coniform opening 35 of a cylindrical jaw compressing member 36. The taper of the opening 35 corresponds to the taper of the outside surfaces of the jaws 40. The jaws 40 are internally recessed and have shoulders 41 against which the nylon sleeve 22 may seat. A tubular member 44 slidably fits over the member 36 and has a central opening 46. Bounding the central opening 46 is a cylindrical wall 48 which has rear conical surface 50 for engaging corresponding conical front end surfaces 52 on the jaws 40. The member 36 may be stationary and the member 44 may be pressed downwardly on the jaws 40 thereby causing the jaws 40 to exert pressure against the nylon sleeve 22. This pressure is transmitted by the deformable plastic sleeve 22 to the thin, flexible, metallic shell 20. The flow characteristics of the sleeve 22 cause the metallic shell to conform exactly to and to intimately contact the outer peripheral surface of the insulating coating 18, even though this surface of the insulating coating be irregular as shown.

Figure 6:
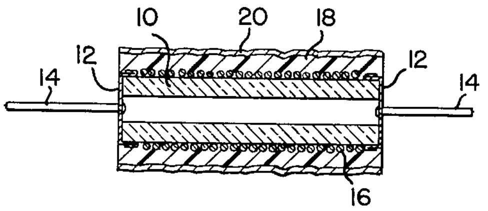
FIG. 6 is a sectional view showing the completed resistor.
Figure 4:
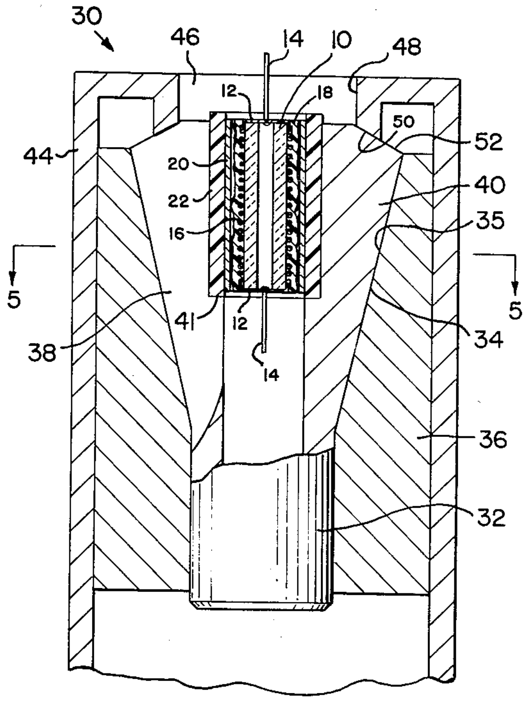
FIG. 4 illustrates the apparatus for physically forcing the metallic shell into intimate contact with insulating covering of the resistor and showing the assembly of FIG. 3 inserted in the apparatus in operative position.
Figure 5:
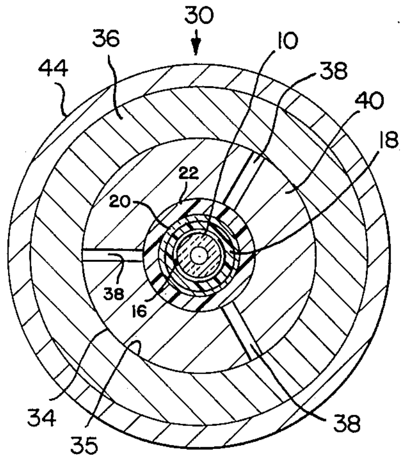
FIG. 5 is a sectional view taken on line 5—5 of FIG. 4 and looking in the direction of the arrows.

The axial force on the member 44 is then released, and the resistor and the plastic sleeve 22 are removed from the collet. The plastic sleeve 22 is then taken off, thus leaving the now-finished component (FIG. 6) having an outer metallic shell whose inner surface is in direct, intimate contact with the outside surface of the insulating coating 18.

Thus, it is apparent, that I have provided a method for making an electrical or electronic component, such as a resistor, which eliminates the need for "potting" and permits the insulating coating to be of minimum thickness to conform to the required dielectric strength of the element to provide for the maximum dissipation of heat.

Furthermore, I have provided an improved method for making an electrical or electronic component whose physical size can be materially reduced as compared to conventional components of equal capacity.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A method of making an electrical component having a conducting portion wound about a dielectric core and connected to wires extending from opposite ends thereof, which comprises coating said core wound portion with a plastic insulating material which when baked permanently hardens into a homogeneous mass, baking said insulating material to harden same, placing a thin metallic shell of uniform thickness around said hardened coating of insulating material, placing a deformable plastic sleeve around said metallic shell and in contact therewith, compressing said plastic sleeve uniformly about its perimeter to force the inner surface of the metallic shell into direct and intimate contact with the outside surface of said coating so that said shell conforms to any surface irregularities in said coating and provides an efficient heat dissipating covering for the component, and subsequently removing said plastic sleeve.

2. A method of making a resistor which includes a plurality of turns of wire wound on a cylindrical core of dielectric material and connected to conductors which extend from opposite ends of said core, comprising the steps of coating the wire wound core with a plastic electrical insulating material to provide an insulating body around said wire of a thickness sufficient to provide the desired dielectric strength for the resistor, curing the coating of insulating material to harden same, placing a thin cylindrical metallic shell of uniform thickness around the heardened coating of insulating material in contact with its outer surface, inserting the whole unit in a deformable plastic sleeve, and applying radial pressure all around said plastic sleeve to compress said shell into intimate contact with the outside surface of said coating so that upon removal of said sleeve said shell conforms to any surface irregularities in said coating and provides an efficient heat dissipating covering for the coated wire wound core.

References Cited in the file of this patent

UNITED STATES PATENTS

| | | |
|---|---|---|
| 808,833 | Goltstein | Jan. 7, 1906 |
| 1,378,442 | Chalfant | May 17, 1921 |
| 1,703,940 | Kollmar | Mar. 5, 1929 |
| 1,913,355 | Wiegand | June 6, 1933 |
| 2,036,788 | Abott | Apr. 7, 1936 |
| 2,053,933 | Abott | Sept. 8, 1936 |
| 2,201,706 | Sukohl | May 21, 1940 |
| 2,317,869 | Walton | Apr. 27, 1943 |
| 2,640,132 | Thom | May 26, 1953 |
| 2,645,701 | Kerridge et. al. | July 14, 1953 |
| 2,738,571 | Turnbull | Mar. 20, 1956 |
| 2,785,270 | Burger | Mar. 12, 1957 |
| 2,851,571 | Pearce | Sept. 9, 1958 |
| 2,942,222 | Nelson | June 21, 1960 |

FOREIGN PATENTS

| | | |
|---|---|---|
| 580,317 | Great Britain | Sept. 3, 1956 |